US009889551B2

(12) United States Patent
Uphues

(10) Patent No.: US 9,889,551 B2
(45) Date of Patent: Feb. 13, 2018

(54) APPARATUS FOR COUPLING AND DECOUPLING BUTTON AND LOOP CONNECTIONS OF A GARMENT

(71) Applicant: Susie Uphues, Dallas, TX (US)

(72) Inventor: Susie Uphues, Dallas, TX (US)

( * ) Notice: Subject to any disclaimer, the term of this patent is extended or adjusted under 35 U.S.C. 154(b) by 183 days.

(21) Appl. No.: 14/922,634

(22) Filed: Oct. 26, 2015

(65) Prior Publication Data

US 2016/0113358 A1 Apr. 28, 2016

Related U.S. Application Data

(60) Provisional application No. 62/069,714, filed on Oct. 28, 2014.

(51) Int. Cl.

| | |
|---|---|
| ***B60R 13/00*** | (2006.01) |
| ***F16B 2/22*** | (2006.01) |
| ***B25G 1/10*** | (2006.01) |
| ***A47G 25/92*** | (2006.01) |
| *A44B 1/00* | (2006.01) |

(52) U.S. Cl.

CPC ............... *B25G 1/10* (2013.01); *A47G 25/92* (2013.01); *A44B 1/00* (2013.01); *Y10T 24/17* (2015.01)

(58) Field of Classification Search

CPC .. B25G 1/10; A44B 1/00; Y10T 24/17; A47G 25/92

See application file for complete search history.

(56) References Cited

U.S. PATENT DOCUMENTS

| | | | | | |
|---|---|---|---|---|---|
| 178,778 | A * | 6/1876 | Hurlbut | A47G 25/92 | 24/40 |
| 511,534 | A * | 12/1893 | Latham et al. | A47G 25/92 | 24/40 |
| 602,848 | A * | 4/1898 | Holmgren | A47G 25/92 | 24/40 |
| 684,915 | A * | 10/1901 | Crandall | A47G 25/92 | 24/40 |
| 691,853 | A * | 1/1902 | Freck | A47G 25/92 | 24/40 |
| 828,625 | A * | 8/1906 | Ogg | B25B 9/02 | 24/40 |
| 986,989 | A * | 3/1911 | Johnson | A47G 25/92 | 24/40 |
| 1,291,563 | A * | 1/1919 | Laughlin | A47G 25/92 | 24/40 |

(Continued)

*Primary Examiner* — Robert Sandy
*Assistant Examiner* — Louis A Mercado
(74) *Attorney, Agent, or Firm* — Lawrence Youst PLLC

(57) ABSTRACT

An apparatus for coupling and decoupling button and loop connections of a garment. The apparatus includes a longitudinally extending body member having a handle member extending from a first end and a pair of prongs extending from an oppositely disposed second end. One prong has a hook on its distal end and the other prong has an expanded end member on its distal end. The prongs are generally parallel with one another forming a gap therebetween such that upon insertion of the prongs into a loop, the prongs cooperate to open the loop and position the loop relative to a button such that rotation of the apparatus about an axis of rotation defined through the prongs proximate the hook and the expanded end causes the loop to be moved relative to the button, thereby coupling or decoupling the loop and the button.

16 Claims, 5 Drawing Sheets

(56) References Cited

U.S. PATENT DOCUMENTS

| | | | | |
|---|---|---|---|---|
| 3,683,459 | A * | 8/1972 | Johansen | A44B 3/00 24/40 |
| 2007/0151082 | A1 * | 7/2007 | Stedje | A47G 25/92 24/40 |
| 2015/0068044 | A1 * | 3/2015 | Watt | C14B 5/00 30/172 |

* cited by examiner

APPARATUS FOR COUPLING AND DECOUPLING BUTTON AND LOOP CONNECTIONS OF A GARMENT

CROSS-REFERENCE TO RELATED APPLICATIONS

The present application claims the benefit of U.S. Provisional Application No. 62/069,714, filed Oct. 28, 2014.

TECHNICAL FIELD OF THE DISCLOSURE

This disclosure relates, in general, to buttoning and unbuttoning garments with button back detail and, in particular, to an apparatus for coupling and decoupling button and loop connections of a garment.

BACKGROUND

Without limiting the scope of the present disclosure, its background will be described with reference to wedding gowns, as an example. There are many styles of wedding gowns that a bride may choose for her special day. For example, wedding gown silhouettes include ballgown, A-Line, modified A-Line, trumpet, mermaid and sheath. Wedding gown necklines include square, scoop, sweetheart, sheer, halter, Queen Ann and bateau. Wedding gown waistlines include basque, dropped, empire, natural and princess. Wedding gown sleeves include strapless, spaghetti straps, straps, sleeveless, cap sleeve, ¾ sleeve and long sleeve. Wedding gown dress lengths include above the knee, knee length, tea length, ankle length and floor length. Wedding gown trains include sweep, court, chapel length and cathedral length. Wedding gown fabrics include charmeuse, chiffon, crepe, duchesse satin, dupioni, georgette, Mikado, organza, satin, shantung, taffeta and tulle.

One aspect many wedding gowns have in common, however, is button back detail in the form of a long series of button and loop connections which may be used in combination with or without a zipper connection. Not only does this button back detail give the wedding gown a brilliant texture but it also look gorgeous as the bride walks down the aisles. It has been found, however, that coupling and decoupling the button and loop connections is tricky and time consuming, typically requiring the dexterity of a bride's helper. Accordingly, a need has arisen for improvements in coupling and decoupling the button and loop connections of a wedding gown.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1A:
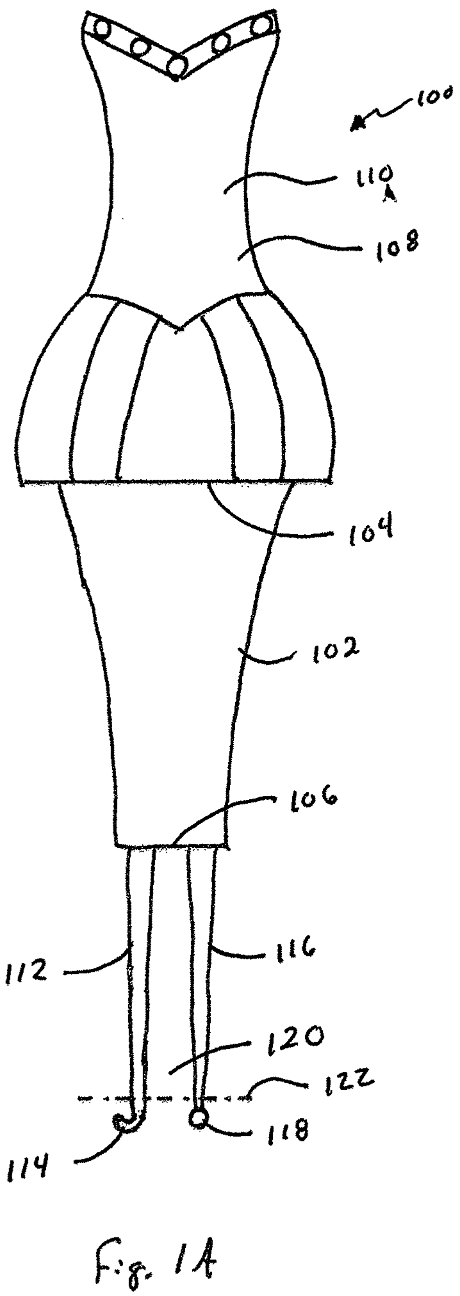
FIGS. 1A-1B are front and side views of an apparatus for coupling and decoupling button and loop connections of a garment according to an embodiment of the present disclosure.

While various embodiments of the present disclosure are discussed in detail below, it should be appreciated that the present disclosure provides many applicable inventive concepts which can be embodied in a wide variety of specific contexts. The specific embodiments discussed herein are merely illustrative and do not delimit the scope of the present disclosure.

In a first aspect, the present disclosure is directed to an apparatus for coupling button and loop connections of a garment having buttons disposed on a first portion of the garment and loops disposed on a second portion of the garment. The apparatus includes a longitudinally extending body member having a first end and an oppositely disposed second end. A handle member extends from the first end of the body member. A first prong extends from the second end of the body member, the first prong having a hook on an end distal from the body member. A second prong extends from the second end of the body member generally parallel with and forming a gap with the first prong. The second prong has an expanded end member on an end distal from the body member. An axis of rotation is defined through the first and second prongs proximate the hook of the first prong and the expanded end of the second prong such that upon insertion of the first and second prongs into a loop that is not coupled with a button, the first and second prongs cooperate to open the loop and position the loop relative to the button such that rotation of the apparatus about the axis of rotation causes the loop to be positioned behind the button, thereby coupling the loop and the button.

In a first embodiment, the handle member may be integral with the body member. In a second embodiment, the first and second prongs may be integral with the body member. In a third embodiment, the first prong may be parallel with the second prong. In a fourth embodiment, the first and second prongs may have tapered longitudinal profiles. In a fifth embodiment, the first and second prongs may have non uniform longitudinal profiles. In a sixth embodiment, the first and second prongs may have uniform longitudinal profiles. In a seventh embodiment, the first and second prongs may be the same length. In an eighth embodiment, the axis of rotation may be perpendicular to a longitudinal axis of the body member. In a ninth embodiment, the handle member may be selected from the group consisting of a wedding gown and a tuxedo jacket.

In a second aspect, the present disclosure is directed to an apparatus for decoupling button and loop connections of a garment having buttons disposed on a first portion of the garment and loops disposed on a second portion of the garment. The apparatus includes a longitudinally extending body member having a first end and an oppositely disposed second end. A handle member extends from the first end of the body member. A first prong extends from the second end of the body member, the first prong having a hook on an end distal from the body member. A second prong extends from the second end of the body member generally parallel with and forming a gap with the first prong. The second prong has an expanded end member on an end distal from the body member. An axis of rotation is defined through the first and second prongs proximate the hook of the first prong and the expanded end of the second prong such that upon insertion of the first and second prongs into a loop that is coupled to a button, the first and second prongs cooperate to open the loop and position the loop relative to the button such that rotation of the apparatus about the axis of rotation causes the loop to be removed from behind the button, thereby decoupling the loop and the button.

Figure 1B:
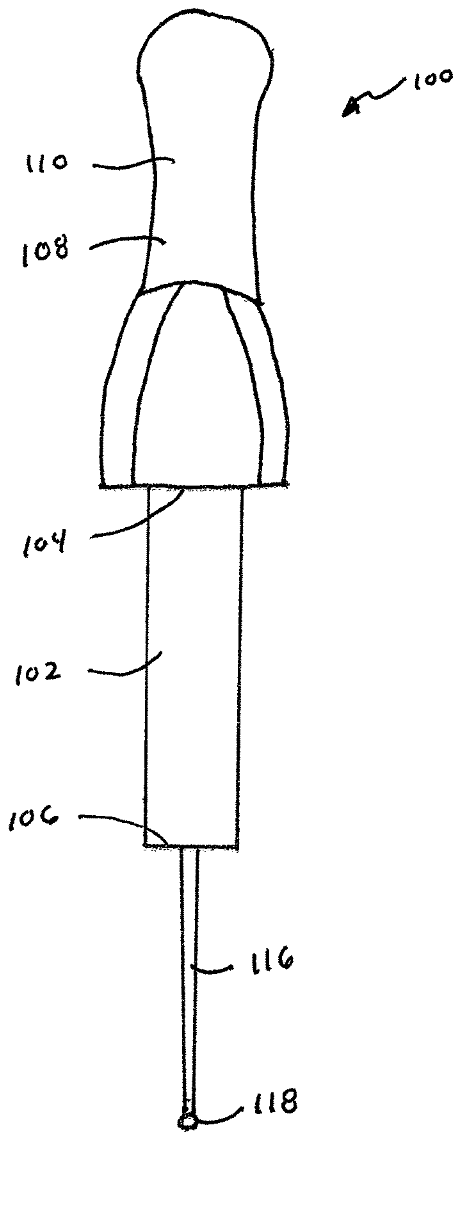

Referring now to FIGS. 1A-1B, therein are depicted front and side views of an apparatus 100 for coupling and decoupling button and loop connections of a garment according to an embodiment of the present disclosure. Apparatus 100 includes a generally longitudinally extending body member 102 having a upper end 104 and an oppositely disposed lower end 106. Even though FIGS. 1A-1B depict apparatus 100 in a vertical orientation, it should be understood by those skilled in the art that the apparatus of the present disclosure is equally well suited for use in other orientations. Accordingly, it should be understood by those skilled in the art that the use of directional terms such as above, below, upper, lower, upward, downward and the like are used in relation to the illustrative embodiments as they are depicted in the figures, the upward direction being toward the top of the corresponding figure and the downward direction being toward the bottom of the corresponding figure. Apparatus 100 includes a handle member 108 that extends upwardly from upper end 104 of body member 102. In the illustrated embodiment, handle member 108 is in the form of a wedding gown 110. Even though FIGS. 1A-1B depict handle member 108 as having a particular design, it should be understood by those skilled in the art that handle members of the present disclosure may have any suitable design that enables the user to hold and control movement of apparatus 100 including, but not limited to, the additional designs discussed below.

Apparatus 100 includes a prong 112 that extends downwardly from lower end 106 of body member 102. Prong 112 has a hook 114 on an end distal from body member 102. Apparatus 100 also includes a prong 116 that extends downwardly from lower end 106 of body member 102. Prong 116 has an expanded end member depicted as a sphere 118 on an end distal from body member 102. In the illustrated embodiment, prongs 112, 116 each have a generally circular cross section and a tapered longitudinal profile wherein prongs 112, 116 have a larger cross section near lower end 106 of body member 102 and a smaller cross section toward the distal ends. In this configuration, prongs 112, 116 are considered to be generally parallel with each other. In addition, prongs 112, 116 form a gap 120 therebetween that is preferably narrower than the width of a button but wide enough to allow prongs 112, 116 to sufficiently open a loop to enable easy coupling and decoupling of the loop and button connection. Toward their distal ends and proximate hook 114 and sphere 118, prongs 112, 116 define an axis of rotation 122, the purpose of which will be described below.

Even though FIGS. 1A-1B depict prongs 112, 116 as having a particular cross section, it should be understood by those skilled in the art that the prongs of the present disclosure may have any suitable cross section, including, but not limited to, an oval cross section, a square cross section, a diamond cross section, a rectangular cross section, a regular polygon cross section or other polygon cross section and the like. Similarly, even though FIGS. 1A-1B depict prongs 112, 116 as having a particular longitudinal profile, it should be understood by those skilled in the art that the prongs of the present disclosure may have any suitable longitudinal profile including, but not limited to, a greater or lessor taper, a uniform longitudinal profile, a non uniform longitudinal profile and the like. Additionally, even though FIGS. 1A-1B depict the expanded end member as sphere 118, it should be understood by those skilled in the art that the expanded end member of the present disclosure may have alternate shapes including, but not limited to, ellipsoid, cube, cuboid, cylinder, tetrahedron, square pyramid, dodecahedron, icosahedron and the like. Also, even though FIGS. 1A-1B depict prongs 112, 116 as being the same length, it should be understood by those skilled in the art that the prongs of the present disclosure may be different lengths. Further, even though FIG. 1A depicts axis of rotation 122 as being generally perpendicular to the longitudinal axis of body member 102, it should be understood by those skilled in the art that the axis of rotation of an apparatus of the present disclosure may deviate from perpendicular by up to 45 degrees or more, particularly in embodiments where prongs 112, 116 are different lengths.

Figure 2A:
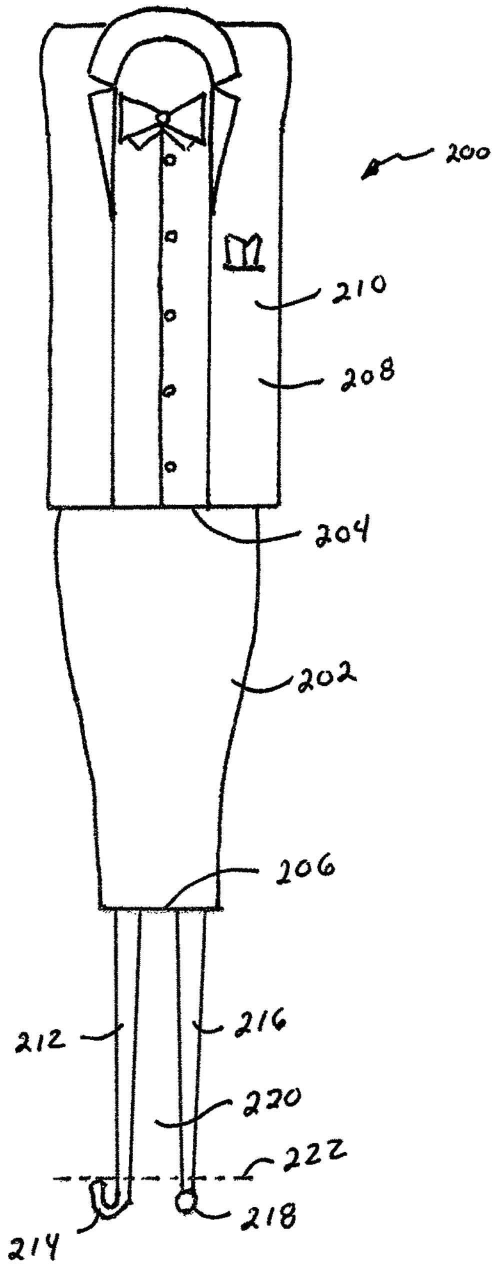
FIGS. 2A-2B are front and side views of an apparatus for coupling and decoupling button and loop connections of a garment according to an embodiment of the present disclosure.
Figure 2B:
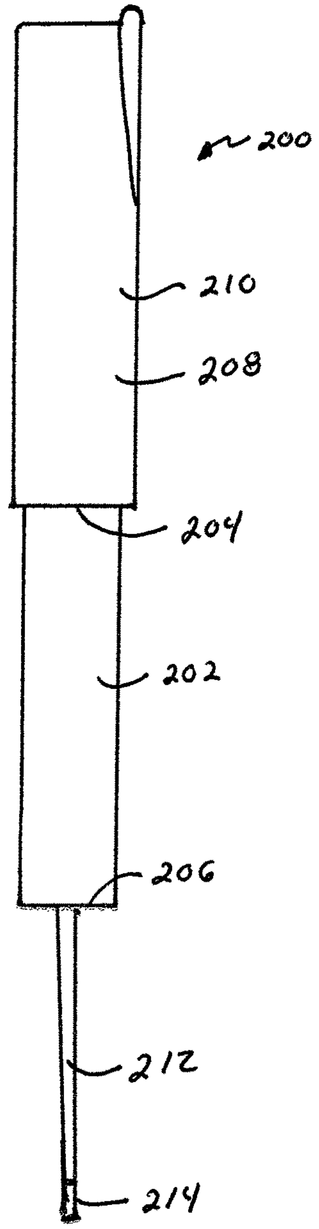

Referring now to FIGS. 2A-2B, therein are depicted front and side views of an apparatus 200 for coupling and decoupling button and loop connections of a garment according to an embodiment of the present disclosure. Apparatus 200 includes a generally longitudinally extending body member 202 having a upper end 204 and an oppositely disposed lower end 206. A handle member 208 extends upwardly from upper end 204 of body member 202. In the illustrated embodiment, handle member 208 is in the form of a tuxedo jacket 210. Apparatus 200 includes a prong 212 that extends downwardly from lower end 206 of body member 202. Prong 212 has a hook 214 on an end distal from body member 202. Apparatus 200 also includes a prong 216 that extends downwardly from lower end 206 of body member 202. Prong 216 has an expanded end member depicted as a sphere 218 on an end distal from body member 202. In the illustrated embodiment, prongs 212, 216 have a generally circular cross section and a tapered longitudinal profile wherein prongs 212, 216 have a larger cross section near lower end 206 of body member 202 and a smaller cross section toward the distal ends. In this configuration, prongs 212, 216 are considered to be generally parallel with each other. In addition, prongs 212, 216 form a gap 220 therebetween that is preferably narrower than the width of a button but wide enough to allow prongs 212, 216 to sufficiently open a loop to enable easy coupling and decoupling of the loop and button connection. Toward their distal ends and proximate hook 214 and sphere 218, prongs 212, 216 define an axis of rotation 222, the purpose of which will be described below.

Figure 3A:
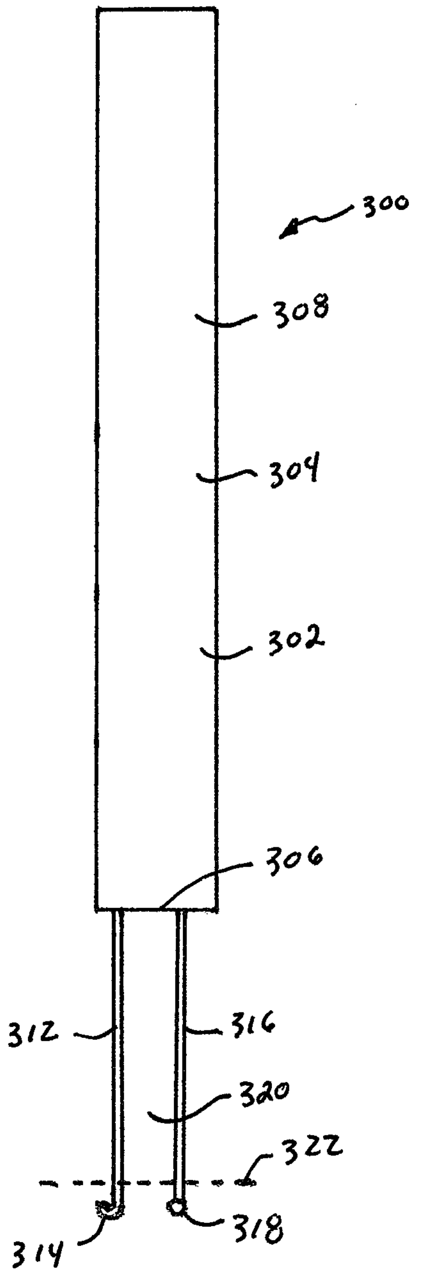
FIGS. 3A-3B are front and side views of an apparatus for coupling and decoupling button and loop connections of a garment according to an embodiment of the present disclosure.
Figure 3B:
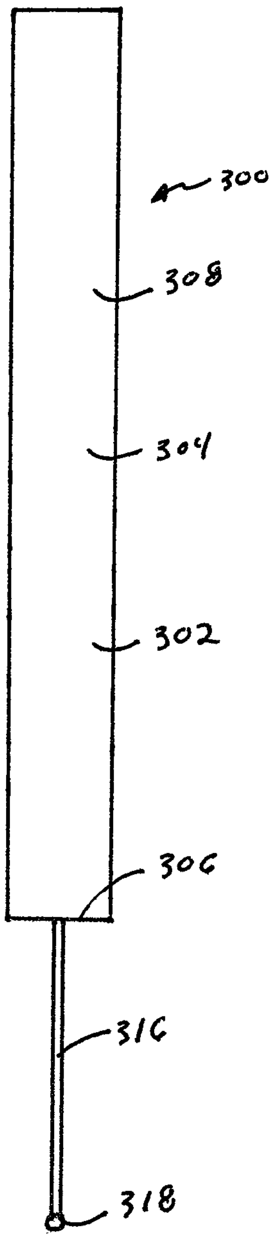

Referring now to FIGS. 3A-3B, therein are depicted front and side views of an apparatus 300 for coupling and decoupling button and loop connections of a garment according to an embodiment of the present disclosure. Apparatus 300 includes a generally longitudinally extending body member 302 having a upper end 304 and an oppositely disposed lower end 306. A handle member 308 extends upwardly from upper end 304 of body member 302. In the illustrated embodiment, handle member 308 is integral with body member 302 but handle member 308 and body member 302 are nonetheless considered to be individual parts. Apparatus 300 includes a prong 312 that extends downwardly from lower end 306 of body member 302. Prong 312 has a hook 314 on an end distal from body member 302. Apparatus 300 also includes a prong 316 that extends downwardly from lower end 306 of body member 302. Prong 316 has an expanded end member depicted as a sphere 318 on an end distal from body member 302. In the illustrated embodiment, prongs 312, 316 have a generally circular cross section with a uniform longitudinal profile forming cylindrical prongs. In this configuration, prongs 312, 316 are parallel with each other. In addition, prongs 312, 316 form a gap 320 therebetween that is preferably narrower than the width of a button but wide enough to allow prongs 312, 316 to sufficiently open a loop to enable easy coupling and decoupling of the loop and button connection. Toward their distal ends and proximate hook 314 and sphere 318, prongs 312, 316 define an axis of rotation 322, the purpose of which will be described below.

Figure 4A:
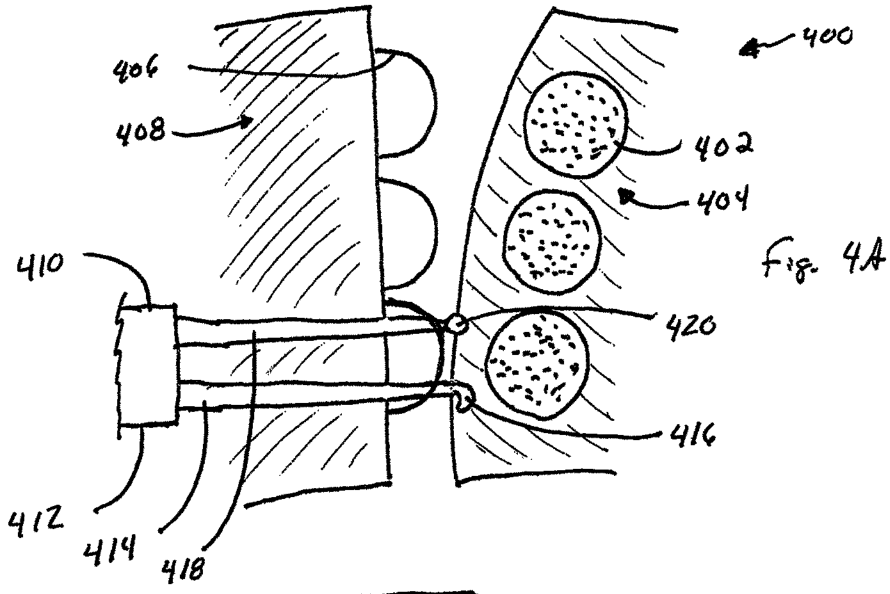
FIGS. 4A-4C are schematic illustrations depicting sequential steps for coupling a button and loop connection using an apparatus for coupling and decoupling button and loop connections of a garment according to an embodiment of the present disclosure.
Figure 4B:
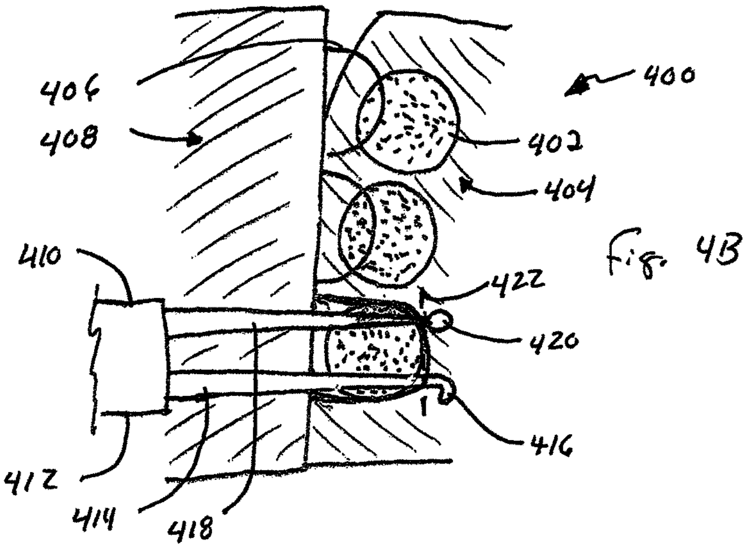
Figure 4C:
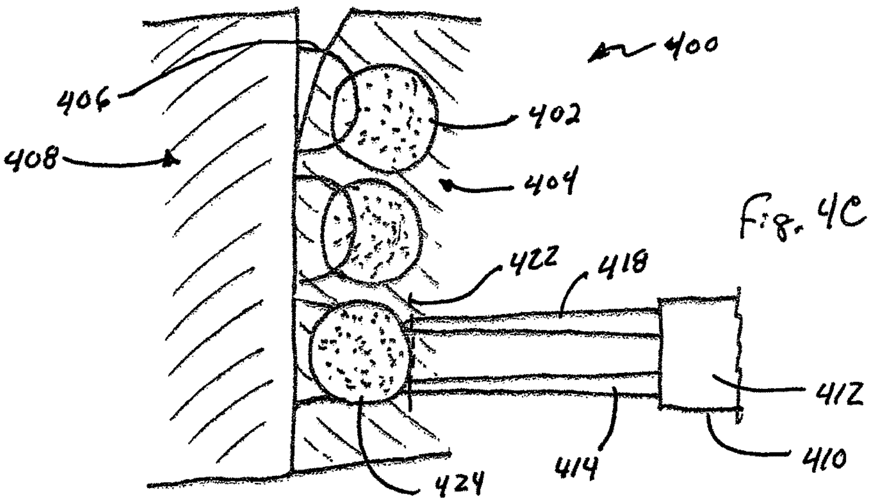

Referring next to FIGS. 4A-4C, therein are schematic illustrations depicting sequential steps for coupling a button and loop connection using an apparatus for coupling and decoupling button and loop connections of a garment according to an embodiment of the present disclosure. In the illustrated embodiment, a section of a garment 400 is depicted wherein a plurality of buttons 402 is disposed on a first portion 404 of garment 400 and a plurality of loops 406 is disposed on a second portion 408 of garment 400. Also illustrated is a portion of an apparatus 410 for coupling and decoupling button and loop connections which is representative of apparatus 100, apparatus 200 or apparatus 300 described above or similar apparatus. In the illustrated portion, apparatus 410 includes body member 412 having a prong 414 with hook 416 and prong 418 with sphere 420 extending therefrom. As best seen in FIG. 4A, prongs 414, 418 are operable to be received within a loop 406. Once disposed within a loop 406, prongs 414, 418 cooperate to maintain the loop 406 in an open configuration. As best seen in FIG. 4B, prongs 414, 418 are operable to position a loop 406 relative to a button 402 by moving and/or stretching the loop 406. Preferably, a rear portion of prongs 414, 418 may be in contact with the button 402 which may helps to determine the exact location of axis of rotation 422 along prongs 414, 418, however, such contact is not required. Once in this configuration, apparatus 410 is rotated about axis of rotation 422 causing loop 406 to be positioned behind button 402, thereby coupling the loop 406 and the button 402 and forming a button and loop connection 424, as best seen in FIG. 4C. After button and loop connection 424 has been formed, apparatus 410 releases the loop 406 and may be sequentially used in a similar manner to continue the process of fully buttoning garment 400.

Figure 5A:
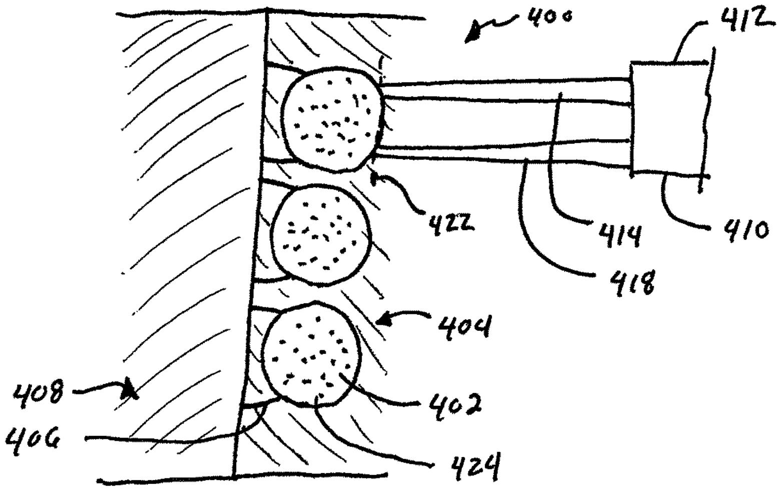
FIGS. 5A-5C are schematic illustrations depicting sequential steps for decoupling a button and loop connection using an apparatus for coupling and decoupling button and loop connections of a garment according to an embodiment of the present disclosure.
Figure 5B:
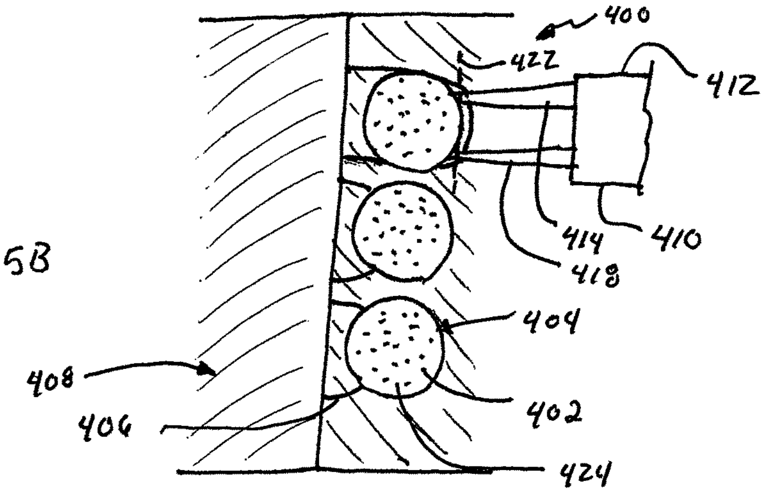
Figure 5C:
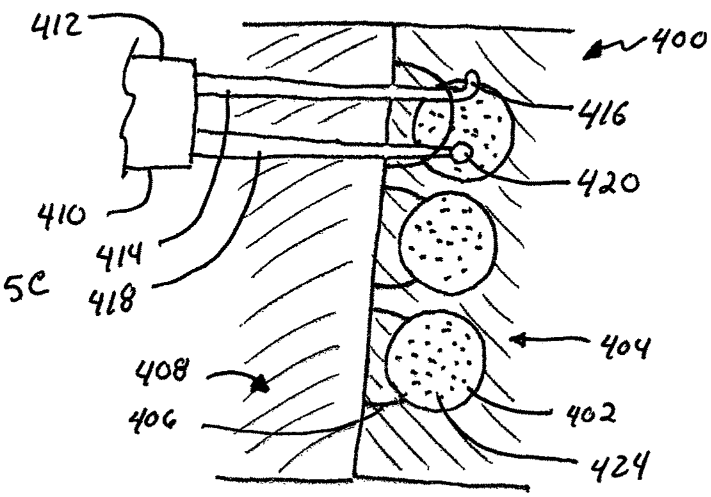

Referring next to FIGS. 5A-5C, therein are schematic illustrations depicting sequential steps for decoupling a button and loop connection using an apparatus for coupling and decoupling button and loop connections of a garment according to an embodiment of the present disclosure. The illustrated embodiment continues the example from FIGS. 4A-4C wherein a section of garment 400 includes a plurality of buttons 402 disposed on first portion 404 of garment 400 and a plurality of loops 406 disposed on second portion 408 of garment 400. Also illustrated is a portion of apparatus 410 includes body member 412 having prong 414 with hook 416 and prong 418 with sphere 420 extending therefrom. To begin the process of decoupling a button and loop connection 424, hook 416 is preferably used to grab a loop 406. Hook 416 may then be used to move and/or stretch the loop 406 such that sphere 420 can be inserted into the loop 406 allowing prongs 414, 418 to cooperate to maintain the loop 406 in an open configuration. From this configuration, prongs 414, 418 are operable to position the loop 406 relative to a button 402 by moving and/or stretching the loop 406, as best seen in FIG. 5A. Preferably, a front portion of prongs 414, 418 may be in contact with the button 402 which may helps to determine the exact location of axis of rotation 422 along prongs 414, 418, however, such contact is not required. Once in this configuration, apparatus 410 is rotated about axis of rotation 422 causing loop 406 to move around the edge of the button 402, as best seen in FIG. 5B. Further rotation of apparatus 410 about axis of rotation 422 causing loop 406 to fully release from the button 402, thereby decoupling the loop 406 and the button 402, as best seen in FIG. 5C. After each button and loop connection 424 has been disconnected, apparatus 410 releases the loop 406 and may be sequentially used in a similar manner to continue the process of fully unbuttoning garment 400.

It should be understood by those skilled in the art that the illustrative embodiments described herein are not intended to be construed in a limiting sense. Various modifications and combinations of the illustrative embodiments as well as other embodiments will be apparent to persons skilled in the art upon reference to this disclosure. It is, therefore, intended that the appended claims encompass any such modifications or embodiments.

What is claimed is:

1. An apparatus for coupling button and loop connections of a garment having buttons disposed on a first portion of the garment and loops disposed on a second portion of the garment, the apparatus comprising:

a longitudinally extending body member having a first end and an oppositely disposed second end;

a handle member extending from the first end of the body member;

a first prong extending from the second end of the body member, the first prong having a hook on a distal end of the first prong; and a second prong extending from the second end of the body member fixedly parallel with, forming a fixed gap with and non-rotatable relative to the first prong, the second prong having a generally spherical end member on a distal end of the second prong;

wherein, the loops include a loop having first and second ends coupled to the second portion of the garment;

wherein, the first and second prongs are of a same length;

wherein, an axis of rotation is defined through the first and second prongs proximate the hook of the first prong and the generally spherical end member of the second prong; and wherein, upon insertion of the first and second prongs through the loop that is not coupled with a button, the first and second prongs cooperate to open the loop and position the loop relative to the button such that rotation of the apparatus about the axis of rotation causes the loop to be positioned behind the button, thereby coupling the loop and the button.

2. The apparatus for coupling button and loop connections as recited in claim 1 wherein the handle member is integral with the body member.

3. The apparatus for coupling button and loop connections as recited in claim 1 wherein the first and second prongs are integral with the body member.

4. The apparatus for coupling button and loop connections as recited in claim 1 wherein the first and second prongs have tapered longitudinal profiles.

5. The apparatus for coupling button and loop connections as recited in claim 1 wherein the first and second prongs have non uniform longitudinal profiles.

6. The apparatus for coupling button and loop connections as recited in claim 1 wherein the first and second prongs have uniform longitudinal profiles.

7. The apparatus for coupling button and loop connections as recited in claim 1 wherein the axis of rotation is perpendicular to a longitudinal axis of the body member.

8. The apparatus for coupling button and loop connections as recited in claim 1 wherein the handle member is selected from the group consisting of a wedding gown and a tuxedo jacket.

9. An apparatus for decoupling button and loop connections of a garment having buttons disposed on a first portion of the garment and loops disposed on a second portion of the garment, the apparatus comprising:

a longitudinally extending body member having a first end and an oppositely disposed second end;

a handle member extending from the first end of the body member;

a first prong extending from the second end of the body member, the first prong having a hook on a distal end of the first prong; and a second prong extending from the second end of the body member fixedly parallel with, forming a fixed gap with and non-rotatable relative to the first prong, the second prong having a generally spherical end member on a distal end of the second prong;

wherein, the loops include a loop having first and second ends coupled to the second portion of the garment;

wherein, the first and second prongs are of a same length;

wherein, an axis of rotation is defined through the first and second prongs proximate the hook of the first prong and the generally spherical end member of the second prong; and wherein, upon insertion of the first and second prongs through the loop that is coupled to a button, the first and second prongs cooperate to open the loop and position the loop relative to the button such that rotation of the apparatus about the axis of rotation causes the loop to be removed from behind the button, thereby decoupling the loop and the button.

10. The apparatus for decoupling button and loop connections as recited in claim 9 wherein the handle member is integral with the body member.

11. The apparatus for decoupling button and loop connections as recited in claim 9 wherein the first and second prongs are integral with the body member.

12. The apparatus for decoupling button and loop connections as recited in claim 9 wherein the first and second prongs have tapered longitudinal profiles.

13. The apparatus for decoupling button and loop connections as recited in claim 9 wherein the first and second prongs have non uniform longitudinal profiles.

14. The apparatus for decoupling button and loop connections as recited in claim 9 wherein the first and second prongs have uniform longitudinal profiles.

15. The apparatus for decoupling button and loop connections as recited in claim 9 wherein the axis of rotation is perpendicular to a longitudinal axis of the body member.

16. The apparatus for decoupling button and loop connections as recited in claim 9 wherein the handle member is selected from the group consisting of a wedding gown and a tuxedo jacket.

* * * * *